(12) United States Patent
Milroy

(10) Patent No.: US 9,927,046 B2
(45) Date of Patent: Mar. 27, 2018

(54) THROTTLING DEVICE

(71) Applicant: Mueller International, LLC, Atlanta, GA (US)

(72) Inventor: Jeff Milroy, Glen Ellyn, IL (US)

(73) Assignee: Mueller International, LLC, Atlanta, GA (US)

( * ) Notice: Subject to any disclaimer, the term of this patent is extended or adjusted under 35 U.S.C. 154(b) by 167 days.

(21) Appl. No.: 14/749,967

(22) Filed: Jun. 25, 2015

(65) Prior Publication Data

US 2016/0377195 A1 Dec. 29, 2016

(51) Int. Cl.
 *F16K 47/08* (2006.01)
 *F16K 17/04* (2006.01)
(52) U.S. Cl.
 CPC ............ *F16K 47/08* (2013.01); *F16K 17/044* (2013.01)
(58) Field of Classification Search
 CPC .............................. F16K 47/08; F16K 17/044
 USPC ... 137/526, 540, 543.15, 543.17, 512, 512.5
 See application file for complete search history.

(56) References Cited

U.S. PATENT DOCUMENTS

| | | | | |
|---|---|---|---|---|
| 693,133 | A | * | 2/1902 | Hennebohle .......... F16K 43/008 137/533.25 |
| 2,019,244 | A | * | 10/1935 | Bergesen, Sr. .......... F16K 15/08 137/512 |
| 5,613,513 | A | | 3/1997 | Makowan |
| 5,765,595 | A | | 6/1998 | Ballum |

OTHER PUBLICATIONS

APCO; Brochure for Air Valves for Vertical Turbine Pumps, located at <http://legacy.library.ucsf.edu/tid/lnf63e00/pdf>, copyright 1979, 4 pgs.
DeZurik, Inc.; Brochure for APCO ASU Combination Air Valve for Wasterwater Service, published Aug. 2014, 8 pgs.
VENT-O-MAT; Brochure for Series RGX: "Anti-Shock" Air Release and Vacuum Break Valves, revised Apr. 2013, 4 pgs.

* cited by examiner

*Primary Examiner* — Craig Schneider
*Assistant Examiner* — P. Macade Nichols
(74) *Attorney, Agent, or Firm* — Taylor English Duma LLP

(57) ABSTRACT

A throttling device comprising: a body having an inner surface and an outer surface, the inner surface defining a body cavity, the inner surface and the outer surface defining a plurality of body orifices in fluid communication through the body cavity; a throttle movably positioned within the body cavity proximate to a first orifice of the plurality of body orifices, the throttle movable to a closed position closing the first orifice and to an open position opening a fluid pathway between the first orifice and the body cavity; and a biasing element biasing the throttle to a partially-open position between the closed position and the open position.

18 Claims, 6 Drawing Sheets

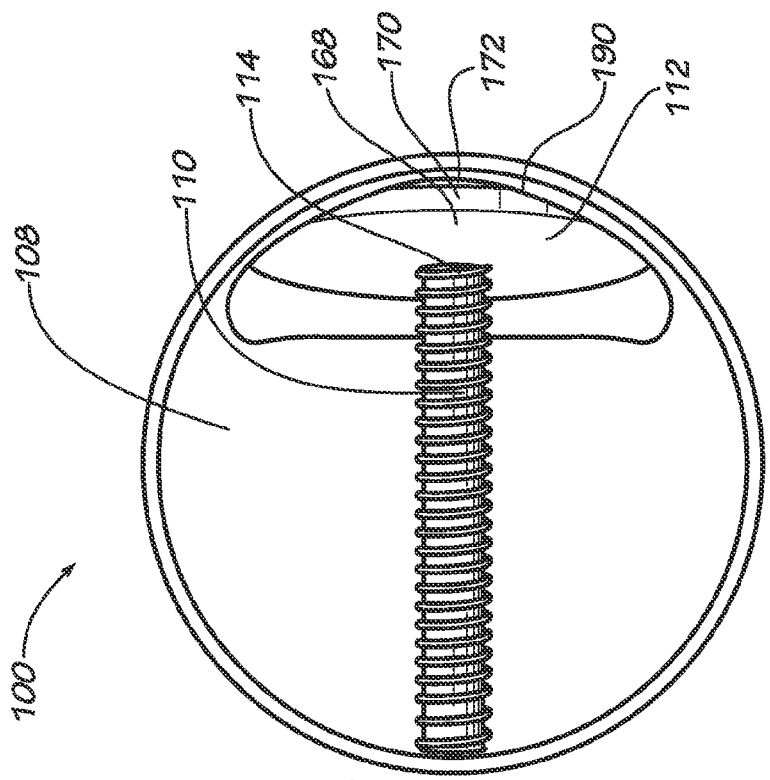
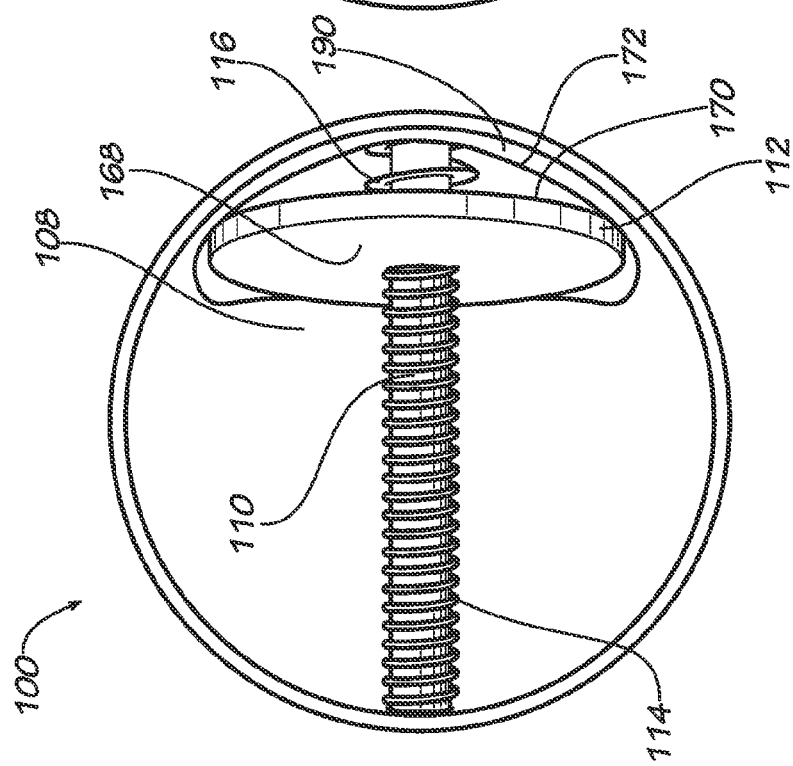

THROTTLING DEVICE

TECHNICAL FIELD

This disclosure relates to throttling devices. More specifically, this disclosure relates to throttling devices used to control air flow and related water surge in piping systems.

BACKGROUND

Air valves are commonly used to vent air from a fluid system such as water or wastewater systems. Air venting is often desired because air entrapped in the fluid system may cause pressure surges and water hammers if left unvented. The surges and water hammers can cause damage to piping and other fluid system components.

Throttling devices, such as double-acting throttling devices, are commonly used to control air flow out of the pipe system. However, current throttling devices are limited because they either have a limited throttling range and/or have only fixed-stop airflow passageways that are not self-compensating to choke flow for surge only as severity of surge increases. Small fixed passages in current throttling devices are also subject to wastewater fouling; open at a single venting air flow rate for vacuum break; and have no self-compensating mechanisms to maximize backpressure exhaust air flow for different surge conditions.

SUMMARY

Disclosed is a throttling device comprising: a body having an inner surface and an outer surface, the inner surface defining a body cavity, the inner surface and the outer surface defining a plurality of body orifices in fluid communication through the body cavity; a throttle movably positioned within the body cavity proximate to a first orifice of the plurality of body orifices, the throttle movable to a closed position closing the first orifice and to an open position opening a fluid pathway between the first orifice and the body cavity; and a biasing element biasing the throttle to a partially-open position between the closed position and the open position.

Also disclosed is an air removal assembly comprising: an air valve mountable on a fluid system; and a throttling device in fluid communication with the air valve, the throttle device further in fluid communication with the fluid system through the air valve when the air valve is mounted on the fluid system, the throttling device including: a body having an inner surface and an outer surface, the inner surface defining a body cavity, the inner surface and the outer surface defining a plurality of body orifices in fluid communication through the body cavity; a throttle movably positioned within the body cavity proximate to a first orifice of the plurality of body orifices, the throttle movable to a closed position closing the first orifice and to an open position opening a fluid pathway between the first orifice and the body cavity; and a biasing element biasing the throttle to a partially-open position between the closed position and the open position.

Also disclosed is a method of venting air from a fluid system through an air removal assembly comprising: venting air from the fluid system through an air valve and a throttling device in fluid communication with the air valve, the throttling device including: a body having an inner surface and an outer surface, the inner surface defining a body cavity, the inner surface and the outer surface defining a plurality of body orifices in fluid communication through the body cavity; a throttle movably positioned within the body cavity proximate to a first orifice of the plurality of body orifices, the throttle movable to a closed position closing the first orifice and to an open position opening a fluid pathway between the first orifice and the body cavity, the fluid pathway at least partially open when venting air from the fluid system through the air valve and the throttling device; and a biasing element biasing the throttle to a partially-open position between the closed position and the open position; and restricting air flow through the throttling device when a venting rate of the air exceeds a predetermined threshold venting rate, the air flow restricted by moving the throttle to the closed position.

Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The features and components of the following figures are illustrated to emphasize the general principles of the present disclosure. Corresponding features and components throughout the figures may be designated by matching reference characters for the sake of consistency and clarity.

FIG. 4 is a bottom view of the throttling device of FIG. 1 showing a neutral position for the throttle in zero vacuum and discharge velocity less than choked flow.

FIG. 5 is a bottom view of the throttling device of FIG. 1 showing a throttle position at velocities exceeding choked flow.

DETAILED DESCRIPTION

Disclosed is a throttling device and associated methods, systems, devices, and various apparatus. The throttling device includes a body, a throttle, and a biasing element. It would be understood by one of skill in the art that the disclosed throttling device is described in but a few exemplary embodiments among many. No particular terminology or description should be considered limiting on the disclosure or the scope of any claims issuing therefrom.

Figure 1:
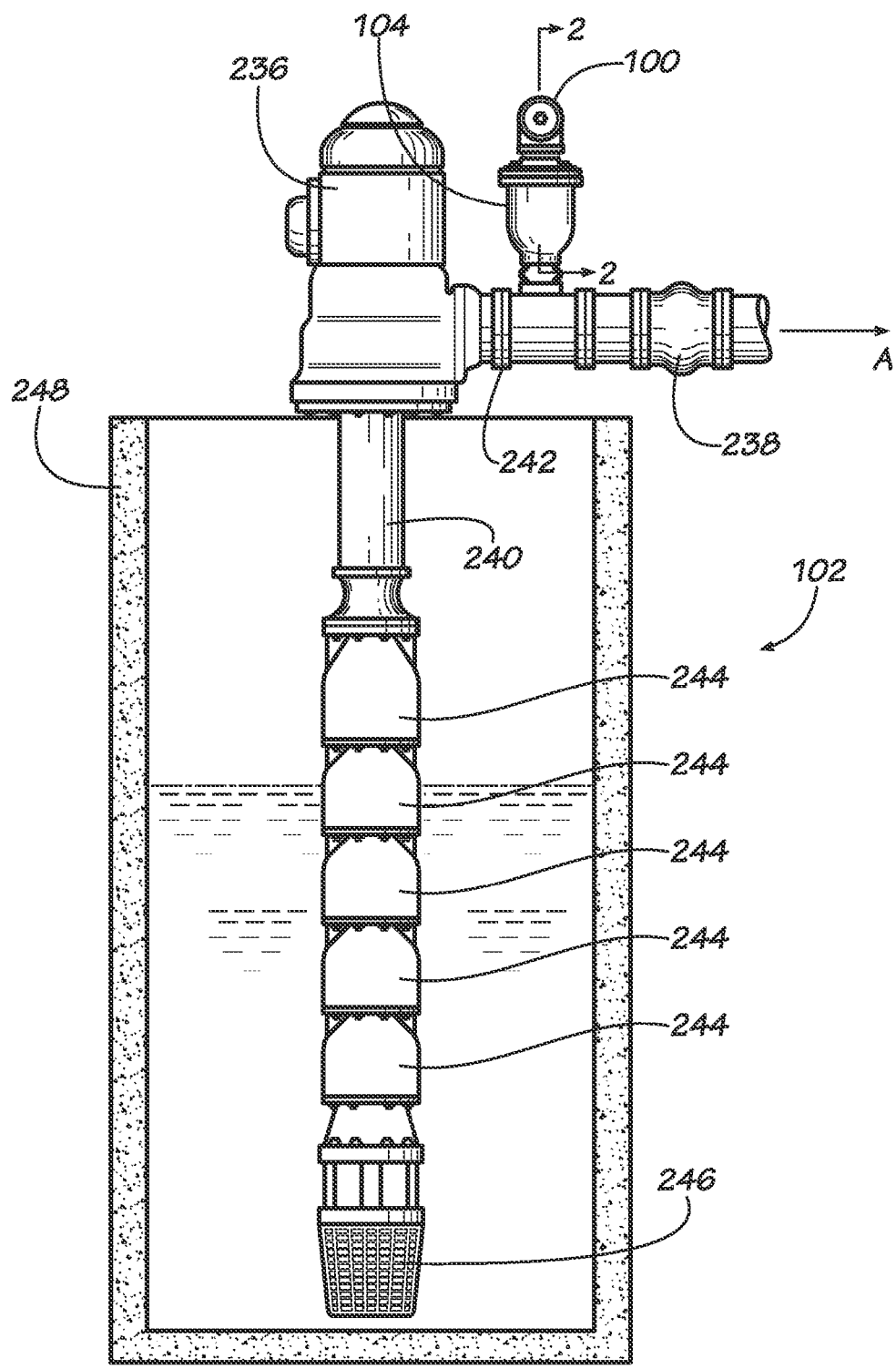
FIG. 1 is a side view of a piping system with an air removal system including throttling device mounted to an air valve in accordance with one embodiment of the current disclosure.

One embodiment of a throttling device 100 is shown in FIG. 1 and described below. In various embodiments, the throttling device 100 is a part of an air removal system connected to a fluid system, such as pipe systems. In various embodiments, the fluid system is part of a water system such as those used by water treatment plants and well systems; however, in various other embodiments, the fluid system can be any fluid system where control of air flow into and out of the system is desired. In the present embodiment, the fluid system is a vertical turbine pipe system 102. The vertical turbine pipe system 102 includes a pump 236 connected to a pump column 240 and a horizontal pipe 242. As shown in FIG. 1, in various embodiments, the pump column 240 extends downward from the pump 236 into a fluid-containing well 248. The pump column 240 may also be connected to a plurality of impeller housings 244. At the end of the pump column 240 after the impeller housings 244 is a strainer 246. In operation, the pump 236 pumps fluid from the well 248 up through the pipe column 240 and out the horizontal pipe 242 such that the fluid flows in a direction indicated by the arrow labeled A in FIG. 1.

An air valve 104 is connected to the horizontal pipe 242 between the pump 236 and a check valve 238. The air valve 104 prevents the passage of a fluid such as water through the air valve 104 but may allow for the ventilation of any air collected in the pipe system 102 coming out of the pump 236 or during pump 236 start-up through the air valve 104. The air valve 104 also may allow for the re-entry of air through the air valve 104 and into the pipe system 102 after pump 236 shutdown to prevent the formation of a vacuum in the pipe system 102 behind the check valve 238. In this manner, the air valve 104 is in fluid communication with the pipe system 102. The check valve 238 prevents a back flowing of water through the pipe 242 after the pump 236 has been turned off.

The throttling device 100 is connected to the top of the air valve 104 as shown in FIG. 1. Together, the throttling device 100 and air valve 104 form the air removal system; however, in various other embodiments, other components may be added to the air removal system to enable air flow into and out of the pipe system 102. The throttling device 100 is in fluid communication with the pipe system 102 and enables air flow into and out of the pipe system 102 through the throttling device 100 in various operating conditions. In various embodiments, the throttling device 100 is in fluid communication with the pipe system 102 through the air valve 104.

Figure 2:
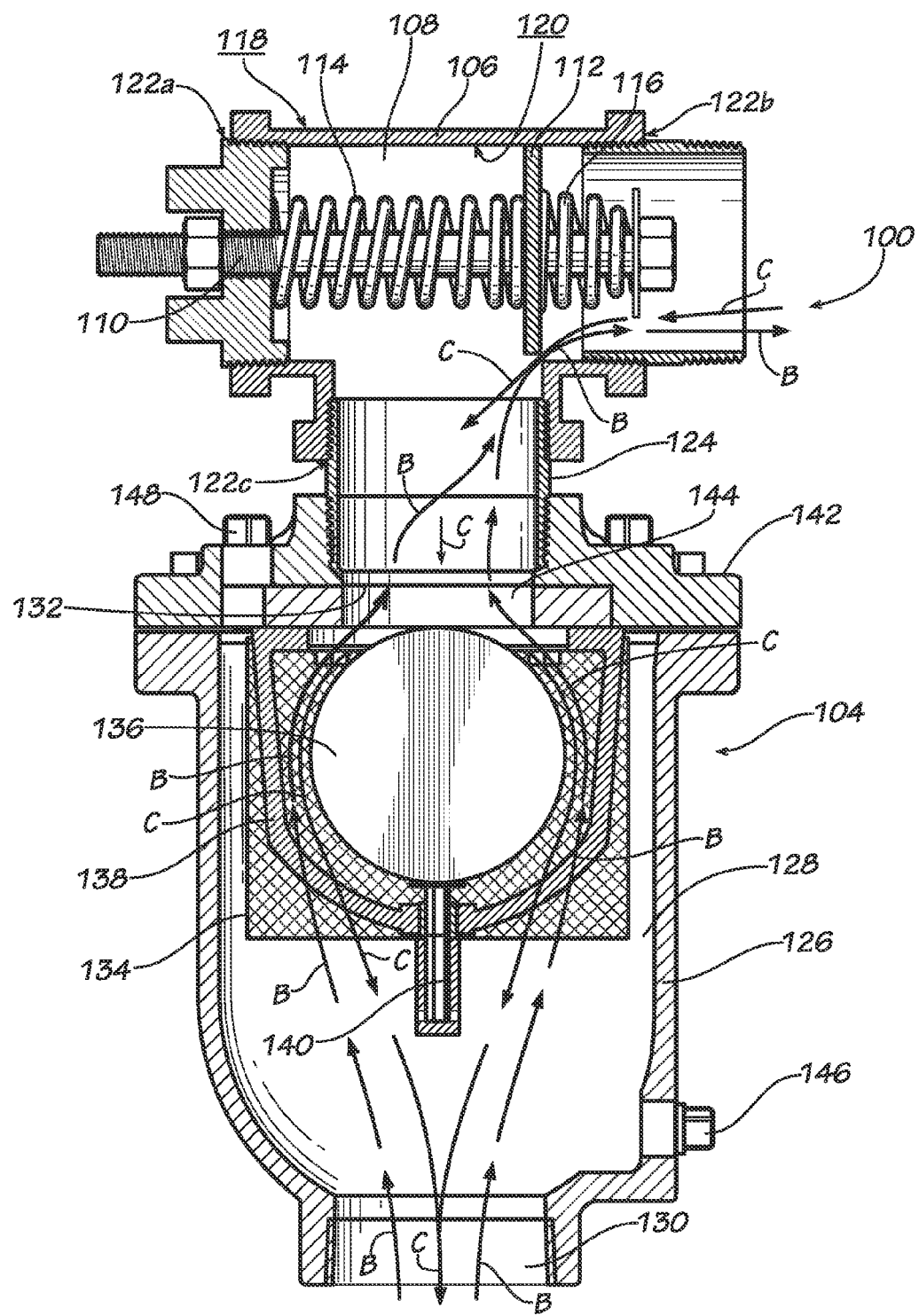
FIG. 2 is a sectional view of the throttling device and air valve of FIG. 1 taken along line 2-2 in FIG. 1.

FIG. 2 is a cross-sectional view of the throttling device 100 in accordance with one embodiment of the current disclosure taken along line 2-2 in FIG. 1 and connected to an exemplary air valve 104. As shown in FIG. 2, in various embodiments, the throttling device 100 includes a body 106 defining a body cavity 108, a throttle 112, and a biasing element. In the present embodiment, the biasing element includes a first spring 114 and a second spring 116; however, in various other embodiments, the biasing element may include a single spring such as the first spring 114. In various other embodiments, the biasing element may include more than two springs. The number of springs in the biasing element and the location of the springs should not be considered limiting on the current disclosure. As described in greater detail below, the biasing element may bias the throttle 112 towards an optimum partially-open position between a closed position and an open position dependent on system pressure and surge conditions. In various embodiments, the throttling device 100 also includes a stem 110 which is partly threaded to movably position the stem 110 in the throttle body 106 and stem support 158. In these embodiments, the throttle 112 is movably positioned on the stem 110.

The body 106 of the throttling device 100 has an outer surface 118 and an inner surface 120. As shown in FIG. 2, in various embodiments, the inner surface 120 defines the body cavity 108 and the inner surface 120 and outer surface 118 define a plurality of body orifices, such as orifices 122a,b,c in communication with each other through the body cavity 108. Although three orifices 122a,b,c are shown in the present embodiment, in various other embodiments, the body 106 includes at least two orifices to allow fluid flow through the body cavity 108. The throttling device 100 will be described in greater detail below with reference to FIG. 3.

As shown in FIG. 2, in various embodiments, the throttling device 100 is connected to and mounted on an air valve 104, which is an exemplary air valve. In various embodiments, a pipe nipple 124 attaches the throttling device 100 to the air valve 104 such that the throttling device 100 is in fluid communication with the air valve 104; however, the disclosure of a pipe nipple 124 should not be considered limiting on the current disclosure. In various other embodiments, various other inserts or connectors may be used to connect the throttling device 100 to the air valve 104 such that the throttling device 100 is in fluid communication with the air valve 104.

In various embodiments, air valve 104 includes a body 126 defining an internal cavity 128 having an inlet 130 and an outlet 132. In various embodiments, the inlet 130 enables fluid communication with the pipe system 102 (shown in FIG. 1) and the outlet 132 enables fluid communication with the throttling device 100. Disposed within the body cavity 128, the air valve 104 may include a diffuser 134 to aerate and moderate water flow. The air valve 104 may also include a float 136 capable of sealing the outlet 132 as the float 136 is buoyant in water and rises and falls along a guide shaft 140 as the water level in the body cavity 128 rises and falls. As shown in FIG. 2, in various embodiments, the float 136 is housed in a baffle 138 proximate to the outlet 132. The air valve 104 can also include a cover 142 connected to the body 126. The cover 142 defines an outlet passageway 144 enabling fluid communication between the outlet 132 and the throttling device 100. As shown in FIG. 2, the air valve 104 can also include pipe plugs 146,148 insertable in the body 126 and cover 142, respectively, to enable a user to open up additional passageways from the body cavity 128 to an exterior of the air valve 104. The foregoing description of the air valve 104 is provided for reference purposes only and should not be considered limiting on the current disclosure. In various other embodiments, the throttling device 100 may be connected to various other air valves with varying designs.

Figure 3:
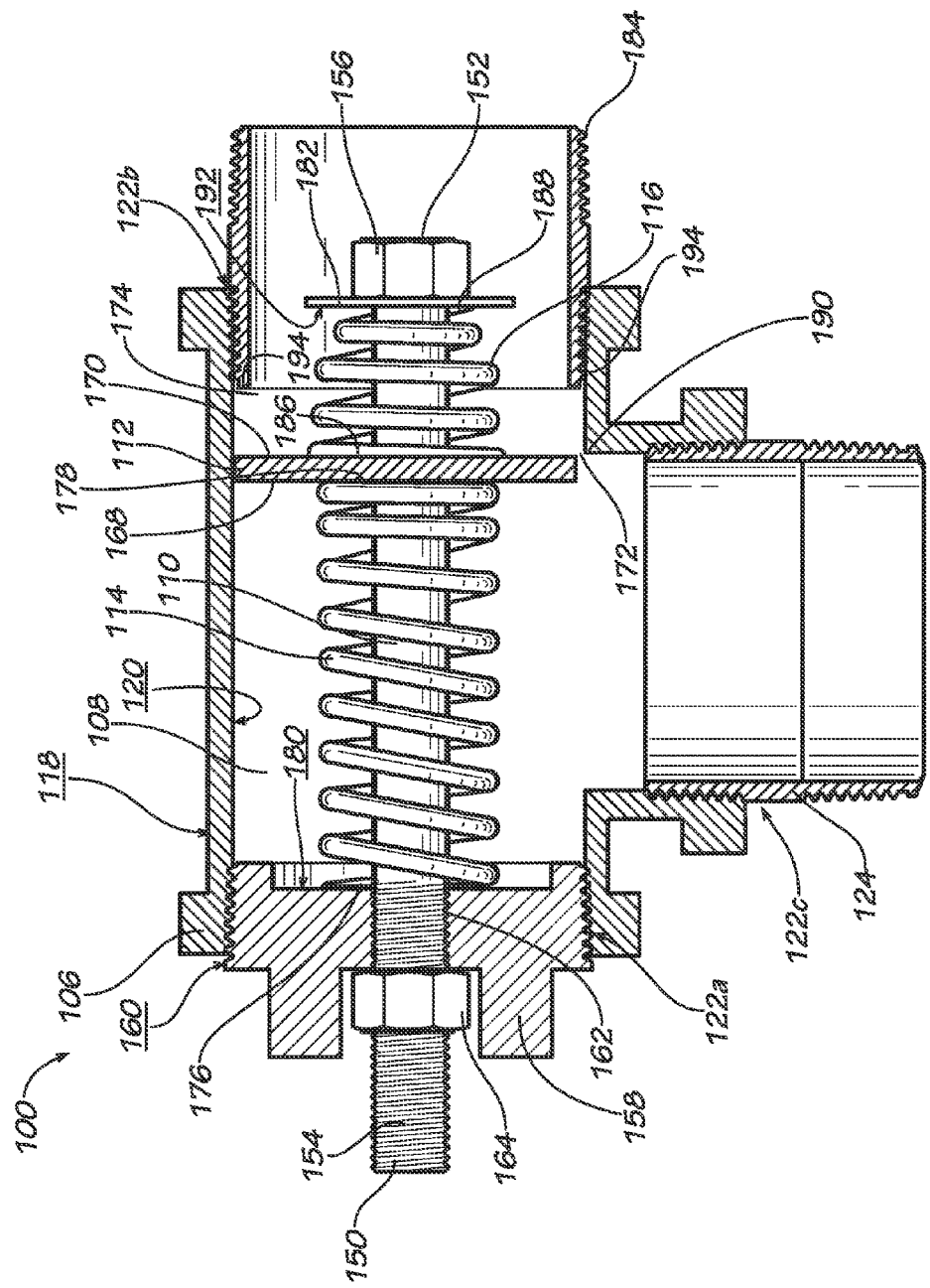
FIG. 3 is a detail sectional view of the throttling device of FIG. 1 including a throttle, a first spring, and a second spring.

FIG. 3 shows a cross-sectional view of one embodiment of the throttling device 100. As previously described, the throttling device 100 includes the body 106 with outer surface 118 and inner surface 120. The inner surface 120 defines the body cavity 108. The inner surface 120 and outer surface 118 define the plurality of body orifices 122a,b,c in fluid communication with each other through the body cavity 108. In various embodiments, the body 106 is constructed from a material which is both durable and heat resistant, such as those materials from the group including, but not limited to, cast iron, ductile iron, carbon steel, stainless steel, and other similar materials.

In various embodiments, the stem 110 is disposed at least partially within the body cavity 108. In the present embodiment, the stem 110 is disposed in the body cavity 108 such that the stem 110 extends substantially between body orifices 122a,b. As shown in FIG. 3, in the current embodiment the stem 110 is a rod-like structure having a first end 150 and a second end 152 distal from the first end 150. In various embodiments, the stem 110 is selected from the group of rod-like structures including, but not limited to, bolts, threaded rods, screw rods, or any other similar structures. As shown in FIG. 3, in various embodiments, the stem 110 includes threading 154 proximate to the first end 150. In various embodiments, the stem 110 further includes a head 156 at the second end 152. In various embodiments, the head 156 is integrally formed with the stem 110, whereas in various other embodiments, the head 156 is fastenably secured to the stem 110 such as through welding, adhesive or other similar mechanisms, or is formed as a single structure with the stem 110. In various other embodiments, the head 156 may be omitted from the stem 110.

As shown in FIG. 3, in various embodiments, the throttling device 100 includes a spring stop proximate to the second end 152 of the stem. In the current embodiment, the spring stop is a collar 182 defining a stop surface 192; however, in various other embodiments, the spring stop may be the head 156, a stop pin, a protrusion from each side of the collar 182, a protrusion from the inner surface 108 of the body, or any other similar structures with which the second spring 116 may engage. In various embodiments, the collar 182 is positioned on the stem 110 proximate to the second end 152 of the stem 110 and against the head 156. In various embodiments, the collar 182 is integrally formed with the stem 110; however, in various other embodiments, the collar 182 may be a separate element such as a washer or other similar device positioned on the stem 110. In various embodiments, the stop surface 192 of the collar 182 creates an adjustable limit for the throttle 112 to move along the stem 110 towards the second end 152.

In various embodiments, the throttling device 100 includes a stem support 158 secured in an orifice of the body 106. In various embodiments, the stem support 158 is also a spring stop. In various embodiments, the stem support substantially fills orifice 122a of the body 106 such that fluid flow is at least substantially prevented, if not completely prevented, through the orifice 122a. As shown in FIG. 3, in these various embodiments, the stem support 158 is a stop plug having a threaded surface 160 for connecting with threading defined in orifice 122a; however in various other embodiments, other similar stem supports 158 may be utilized to both support the stem 110 and at least substantially prevent fluid flow through the orifice 122a. In the present embodiment, the stem support 158 is connected to the body 106 in the first body orifice 122a; however, in various other embodiments, the stem support 158 may be secured in another body orifice 122. As shown in FIG. 3, when the stem support 158 is connected to the body 106, the stem support 158 is at least partially disposed within the body cavity 108 in the current embodiment. In various embodiments, the stem support 158 defines a central passageway 162 therethrough and configured to accept the stem 110 through the central passageway 162. In various embodiments, the central passageway 162 includes threading to engage threading 154 of the stem 110. As shown in FIG. 3, after the first end 150 of the stem 110 is inserted through the central passageway 162 to a desired position, a fastener, such as a nut 164, may be positioned and secured on the stem 110 to secure the stem 110 to the stem support 158. As shown in FIG. 3, in various embodiments, the stem support 158 further includes a stop surface 180.

In various embodiments, the throttling device 100 also includes the throttle 112 movably positioned on the stem 110. In various embodiments, the throttle 112 may be selected from the group including, but not limited to, a disc, a plate, a ball, or any other similar item that may be movably positioned on the stem 110 within the body cavity 108 and having a surface or surfaces on which the first spring 114 and the second spring 116 may engage and act upon to regulate the flow of air or any other gas into and out of the throttling device 100. In the present embodiment, the throttle 112 is a disc.

As shown in FIG. 3, in various embodiments the throttle 112 has a first side 168 and a second side 170. However, in various other embodiments, for example when the throttle 112 is a ball, the throttle 112 may not have a first side 168 and a second side 170. In these embodiments, the first spring 114 may engage and act upon a first portion of the throttle 112 and the second spring 116 may engage and act upon a second portion of the throttle. The number of sides of the throttle should not be considered limiting on the current disclosure.

In various embodiments, the throttle 112 is secured on the stem 110 such that the throttle 112 is disposed within the body cavity 108. In these embodiments, the portion of the body cavity 108 between the between the second side 170 and body orifice 122b defines a passageway 174 having a passageway opening 172. In various embodiments, the passageway opening 172 is defined as the opening formed between a body corner 190 and the second side 170 of the throttle 112. As will be described below with reference to the first spring 114 and the second spring 116, the throttle 112 is movably positioned on the stem 110 to increase or decrease a length of the passageway 172, defined as a distance from the second side to the orifice 122b. As the length of the passageway 172 is increased or decreased, the size of the passageway opening 172 is likewise increased or decreased. In various embodiments, the throttle 112 is constructed from a metallic material which is both durable and heat resistant, such as those materials from the group including, but not limited to, cast iron, ductile iron, carbon steel, stainless steel, and other similar materials.

As shown in FIG. 3, the throttling device 100 includes the first spring 114 having a first end 176 and a second end 178 and a second spring 116 having a first end 186 and a second end 188. The first spring 114 is positioned on the stem 110 such that the first end 176 of the spring 114 engages the stop surface 180 of the stem support 158 and the second end 178 of the spring 114 engages the first side 168 of the throttle 112. The second spring 116 is positioned on the stem 110 such that the first end 186 of the spring 116 engages the second side 170 of the throttle 112 and the second end 188 of the spring engages the stop surface 192 of the collar 182.

In the present embodiment, the first spring 114 is a straight compression spring and the second spring 116 is a conical shape spring. However, in various other embodiments, the first spring 114 and second spring 116 may be any combination of straight compression springs, conical shape springs, or any other specially shaped springs. Furthermore, in various other embodiments, the first spring 114, the second spring 116, or both springs 114,116 may comprise a multiple spring staged engagement using a nested spring design. In these embodiments, the nested spring design may be utilized to achieve different venting rates as will be described below. In various other embodiments, the springs 114,116 are not positioned on the stem 110 but instead are positioned adjacent to the stem 110 such that the first spring 114 is still engaged with the stem support 158 and the throttle 112 and the second spring 116 is still engaged with the collar 182 and the throttle 112. As will be described below in greater detail with reference to FIGS. 4 and 5, in various embodiments the first spring 114 has a first spring rate and the second spring 116 has a second spring rate. In various other embodiments, the springs 114,116 engage the throttle 112 and structures other than the stem support 158 and the collar 182. For example, in various other embodiments, the springs 114,116 engage the throttle 112 and various spring stops such as the head 156 of the stem 110, a stop pin, a protrusion from each side of the collar 182, a protrusion from the inner surface 108 of the body, or any other similar structures with which the springs 116 may engage.

In the current embodiment, the throttling device 100 includes a pipe nipple 124 connected to the body 106 in the orifice 122c such that the pipe nipple 124 is at least partially disposed within the body cavity 108 in various embodiments. As described previously with reference to FIG. 2, the pipe nipple 124 or other similar connecting device enables the throttling device 100 to connect with a pipe system 102 or air valve 104 in a pipe system 102. In various embodiments, the throttling device 100 is in fluid communication with the air valve 104 and pipe system 102 through the pipe nipple 124. As shown in FIG. 3, in various embodiments, the throttling device 100 also includes a pipe nipple 184 connected to the body 106 in the orifice 122b such that the pipe nipple 184 is at least partially disposed within the body cavity 108. In various embodiments, the pipe nipple 184 is connected to the body 106 such that at least a part of the stem 110 is at least partially disposed within the pipe nipple 184. In various embodiments, an end 194 of the pipe nipple 184 disposed within the body cavity 108 defines a throttle stop which may engage the second side 170 of the throttle 112. In the current embodiment, pipe nipples 124, 184 connect with threading of the body 106. In various embodiments, the throttle stop provides a physical stop point for the throttle 112. In various embodiments, the throttle 112 engages the throttle stop in super-sonic air flow conditions at a maximum design pressure of the pipeline upstream of the throttle.

Within the design pressure limit of a pipeline's maximum fluid flow capacity when a restriction or narrowing of the pipeline or valve passageway is placed in the flow path, the parameter that becomes "choked" or "limited" is the fluid velocity. Thus, choked flow may be defined as a compressible flow effect that is a fluid dynamic condition associated with the Venturi effect. For homogeneous fluids, the physical point at which the choking occurs for adiabatic conditions is when an exit velocity is at sonic conditions. At choked flow, the mass flow rate can be increased by increasing pressure (density) upstream and at the choke point.

Choked flow of gases, such as air, is useful in flow control engineering applications because the mass flow rate is independent of downstream pressure, and depends only on the pressure (density) of the gas on the upstream side of the restriction. Under choked flow conditions, valve throttles and calibrated variable passage areas can be used to produce a desired optimal mass flow rate through an air valve while maintaining optimal upstream backpressure to minimize surge.

In various embodiments, and assuming ideal gas behavior, steady-state choked flow occurs when downstream pressure falls below a critical pressure value ($P_C$). $P_C$ may be calculated from the dimensionless critical pressure ratio equation:

$$\frac{PC}{PI} = \left(\frac{2}{n+1}\right)^{\left(\frac{n}{n-1}\right)}$$

Where $P_C$ is the critical pressure value, $P_I$ is the upstream pressure, and n is the index of isentropic expansion or compression for the fluid in the system. For a perfect gas undergoing an adiabatic process, the index n is the specific heat ratio of the gas. In various embodiments, a $P_C$:$P_I$ pressure ratio of 2:1 will cause sonic flow; however, in various other embodiments, a ratio other than 2:1 will cause sonic air flow. In various other embodiments, the throttle 112 engages the throttle stop at operating conditions other than sonic air flow.

FIGS. 4 and 5 respectively show an internal view of the throttling device 100 through orifice 122c.

As previously described, the first spring 114 is has a first spring rate and the second spring 116 is has a second spring rate. When assembled, the first spring 114 having the first spring rate and the second spring 116 having the second spring rate work together against the throttle 112 to control incoming air and exhaust venting air flowing through the passageway opening 172. In these embodiments, the first spring 114 sets a lower limit on the air flow through the passageway opening 172 by biasing the throttle 112 to reduce the size of the passageway opening 172. In these embodiments, the first spring 114 biases the throttle 112 towards a closed position. The second spring 116 sets an upper limit on the air flow through the passageway opening 172 by biasing the throttle 112 to increase the size of the passageway opening 172. In these embodiments, the second spring 116 biases the throttle 112 towards an open position. In these embodiments, the first spring 114 and second spring 116 together bias the throttle to a partially open position at rest.

As air flow conditions in the pipe system 102 change, the springs 114,116 move the throttle 112 along the stem 110, which in turn gradually increases or decreases the size of the passageway opening 172. These air flow conditions include, but are not limited to, pump start-up, shutdown, normal operations, and critical conditions such as power failures, pipe line breaks, or other critical conditions. During conditions such as start-up of the pump 236 or during operation of the pump 236, air in the pipe system 102 is exhausted through the air valve 104, into orifice 122c of the throttling device 100, and out of the throttling device 100 through orifice 122b into the atmosphere. The exhaust air flow is indicated by the arrows labeled B in FIG. 2. During conditions such as shut down of the pump 236, a low pressure condition occurs at orifice 122c, which creates backpressure against the throttle 112 and causes air flow into orifice 122b of the throttling device 100, out of the throttling device 100 through orifice 122c into the air valve 104, and through the air valve 104 into the pipe system 102. The intake air flow is indicated by the arrows labeled C in FIG. 2.

The rate of exhaust air flow through orifice 122b is adjusted by setting a position of the throttle 112 relative to orifice 122b by using the stem 110. In various embodiments, a position is set by inserting the stem 110, with the biasing element and throttle 112 already mounted, into the stem support 158. The stem 110 with the biasing element and throttle 112 mounted on the stem 110 is then secured to the stem support 158 though adjustment of the nut 164. The nut 164 together with the biasing element and throttle combination acting against the head 156 of the stem 110 hold the stem 110 in place in the body 106. In various embodiments, after the throttle 112 is at a desired position relative to orifice 122b, the nut 164 locks the position setting of the throttle 112. A desired exhaust air flow rate and intake air flow rate may therefore be initially established by a user through this initial positioning of the throttle 112 relative to orifice 122b. An initial position of a throttle 112 is shown in FIG. 4. In various embodiments, a desired air flow occurs at about 2 PSIG backpressure or less; however, in various other embodiments, the desired air flow may occur at pressure other than 2 PSIG backpressure, such as more than 2 PSIG back pressure or less than 2 PSIG backpressure.

In various conditions, the air flow rate into or out of the pipe system 102 may exceed the desired flow rate. These conditions include a sudden rise or fall in pressure in the pipe system caused by an abrupt change in the fluid velocity within the pipe system. These abrupt changes in flow may be caused by rapid closing or opening of valves, sudden starting or stopping of pumps such as during a power failure, or various other factors. The sudden rise or fall in pressure in the pipe system may cause major problems in the pipe system, from noise and vibration to pipe collapse. For example, when a valve is suddenly closed downstream of a fluid in the pipe system 102, the fluid before the closed valve is still moving, thereby building up high pressure and a resulting shock wave. If this pressure is high enough, pipes may burst. In various embodiments, a pipe burst pressure is defined as the condition where internal pressure within the pipe system 102 is at a point sufficiently greater than external pressure and the pipe bursts. The pipe burst pressure varies depending on pipe design and materials.

On the other hand, for example, when an upstream valve in the pipe system 102 closes, fluid downstream of the closed valve attempts to continue flowing away from the closed valve, creating a sudden fall in pressure, or vacuum. A vacuum is defined as the condition where air pressure in the pipe system 102 is below the atmospheric pressure. If this pressure drop is significant enough, the vacuum may cause the pipe to collapse or implode. In various embodiments, a pipe collapse pressure is defined as the condition where external pressure is at a point sufficiently greater than the internal pressure within the pipe system 102 and the pipe collapses. The pipe collapse pressure varies depending on pipe design and materials.

When air pressure in the pipe system 102 increases and exhaust air flow from orifice 122c to 122b exceeds a desired flow rate, the air flow acts against the throttle 112 to push the throttle 112 towards the closed position and against the second spring 116, thereby preventing excessive flow through the air valve 104 and preventing a sudden rise in pressure in the pipe system 102. FIG. 5 shows an instance where the exhaust air flow exceeds a desired flow rate and the throttle 112 is pushed towards the closed position. By adjusting the stem 110, the throttle 112 can be moved and thereby the air flow through the throttling device 100 can be controlled, including setting the maximum air flow rate that pushes the throttle 112 into the closed position. In various embodiments, the closed position is a maximum throttle position where the throttle 112 is seated against the pipe nipple 194. In various embodiments, the air flow exhaust rate occurs when pressure differential across the body cavity 108 is less than or equal to 2 PSIG. In various embodiments, at higher pressure differentials, the exhaust air flow velocity rate is too high and the passageway opening 172 of the throttling device 100 needs to be minimized to build pipeline backpressure and slow down advancing water column and thus minimize possible water hammer.

When air pressure in the pipe system 102 decreases, the low pressure in orifice 122c and the pipe system 102 relative to orifice 122b creates backpressure on the throttle 112. This backpressure acts against the throttle 112 to pull the throttle 112 towards the open position and against the first spring 114, thereby allowing increased air flow into the pipe system 102 through the air valve 104 and preventing a sudden fall in pressure in the pipe system 102.

In this manner, the throttling device 100 with dual springs 114,116 is self-adjusting to maintain maximum exhaust air flow while pressure in the pipe system 102 increases, such as for pressure differentials greater than 2 PSIG. This configuration also enables the throttling device 100 to minimize incoming volume of relieving air while keeping a vacuum level in the pipe system 102 to less than pipe collapse pressure.

Figure 6:
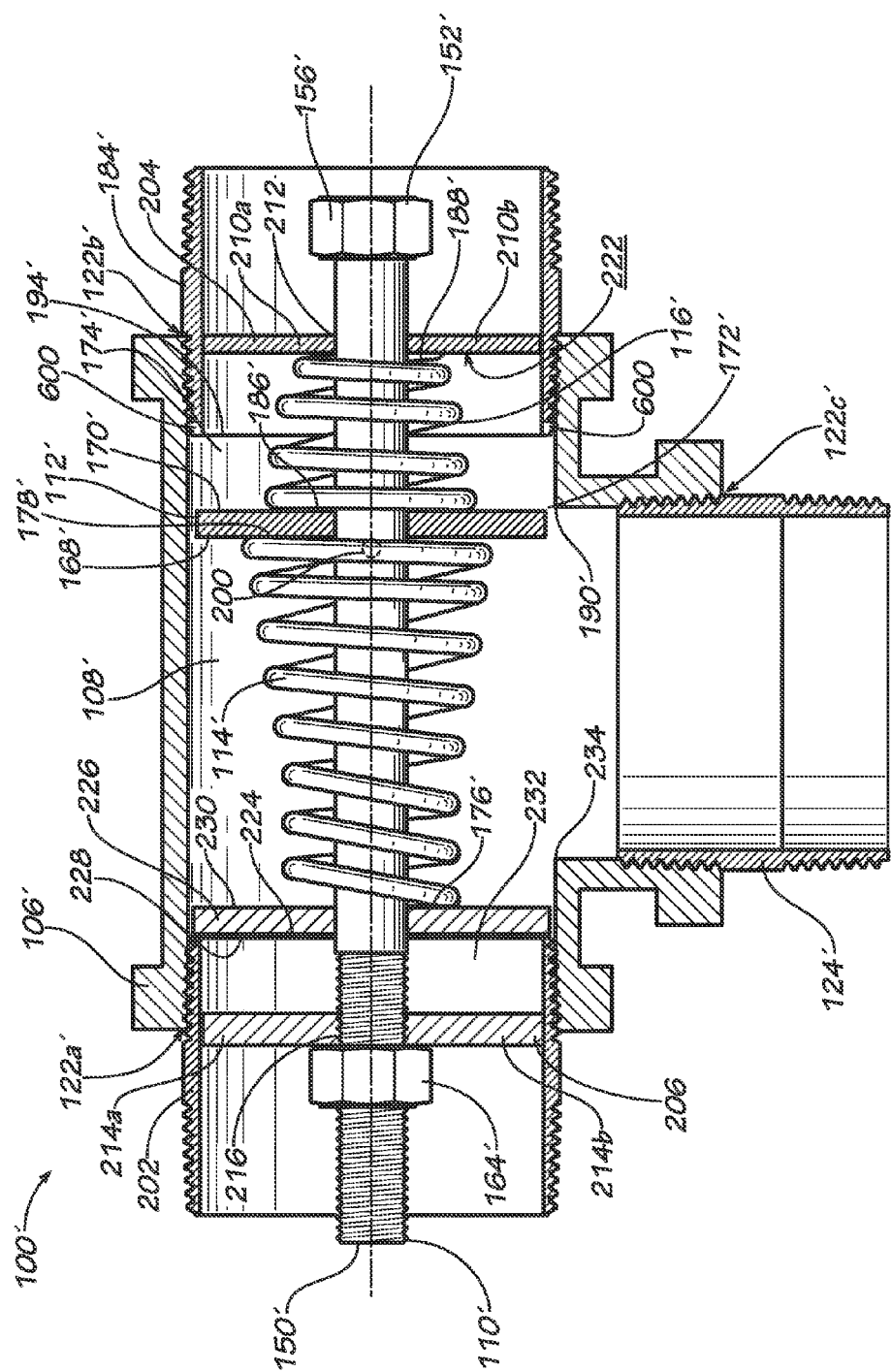
FIG. 6 is a sectional view of a throttling device in accordance with another embodiment of the current disclosure.

FIG. 6 shows a cross sectional view of a throttling device 100' in accordance with another embodiment of the current disclosure. In the present embodiment, body 106', body cavity 108', and orifices 122a',b',c' are substantially similar to body 106, body cavity 108, and body orifices 122a,b,c. Pipe nipple 124' is substantially similar to pipe nipple 124 and pipe nipple 184' having end 194' is substantially similar to pipe nipple 184 having end 194. A biasing element with a first spring 114' having a first end 176' and a second end 178' is substantially similar to the biasing element having the first spring 114 except that first spring 114' is a conical shaped spring whereas first spring 114 is a straight compression spring. In various embodiments, a conical spring may provide a near constant spring rate and may have a lower height compared to straight compression springs. In addition, conical springs may provide more lateral stability and less tendency to buckle compared to straight compression springs. A biasing element with a second spring 116' having a first end 186' and a second end 188' is substantially similar to the biasing element having the second spring 116. Throttle 112' having a first side 168' and a second side 170' is substantially similar to throttle 112. Passageway 174' with passageway opening 172' between the second side 170' a body corner 190' of the body 106' is substantially similar to passageway 174 and passageway opening 172.

As shown in FIG. 6, stem 110' is substantially similar to stem 110, including head 156' similar to head 156, except that stem 110' further includes a stop pin 200 positioned on the stem 100' between a first end 150' and a second end 152' of the stem 100'. In various embodiments, the stop pin 200 is a physical stop point for the throttle 112' which limits movement of the throttle 112' along the stem 110' towards the first end 150'.

As shown in FIG. 6, in various embodiments, the throttling device 100' includes a pipe nipple 202 connected to the body 106' in the orifice 122c' such that the pipe nipple 202 is at least partially disposed within the body cavity 108'. In various embodiments, the pipe nipple 202 is substantially similar to the pipe nipple 184'. In various embodiments, the pipe nipple 202 is connected to the body 106' such that at least a part of the stem 110' is at least partially disposed within the pipe nipple 202. In various embodiments, an end 224 of the pipe nipple 202 disposed within the body cavity 108' defines a throttle stop. In these embodiments, the throttle stop provides a physical stop point for a second throttle 226, which will be described in greater detail below.

In various embodiments, the throttling device 100' includes a first stem support 204 positioned in pipe nipple 184' and a second stem support 206 positioned in pipe nipple 202. In the present embodiment, the first stem support 204 is a spring stop. In the present embodiment, the stem supports 204,206 are spoke and nipple assemblies enabling fluid flow through the stem support between the spokes of the nipple and spoke assembly. Although described as assemblies in the present embodiment, in various other embodiments, the spoke and nipple are integrally formed as a single part. As shown in FIG. 6, stem support 204 includes a first central nipple 212, configured to receive the stem 110' through the first central nipple 212, and spokes, such as spokes 210a,b, connecting the first central nipple 212 to the pipe nipple 184'. In the present embodiment, central nipple 212 does not include threading to threadably engage the stem 110'; however, in various other embodiments, the central nipple 212 may include threading to threadably engage the stem 110'. In various embodiments, the first stem support 204 also defines a stop surface 222.

Figure 7:
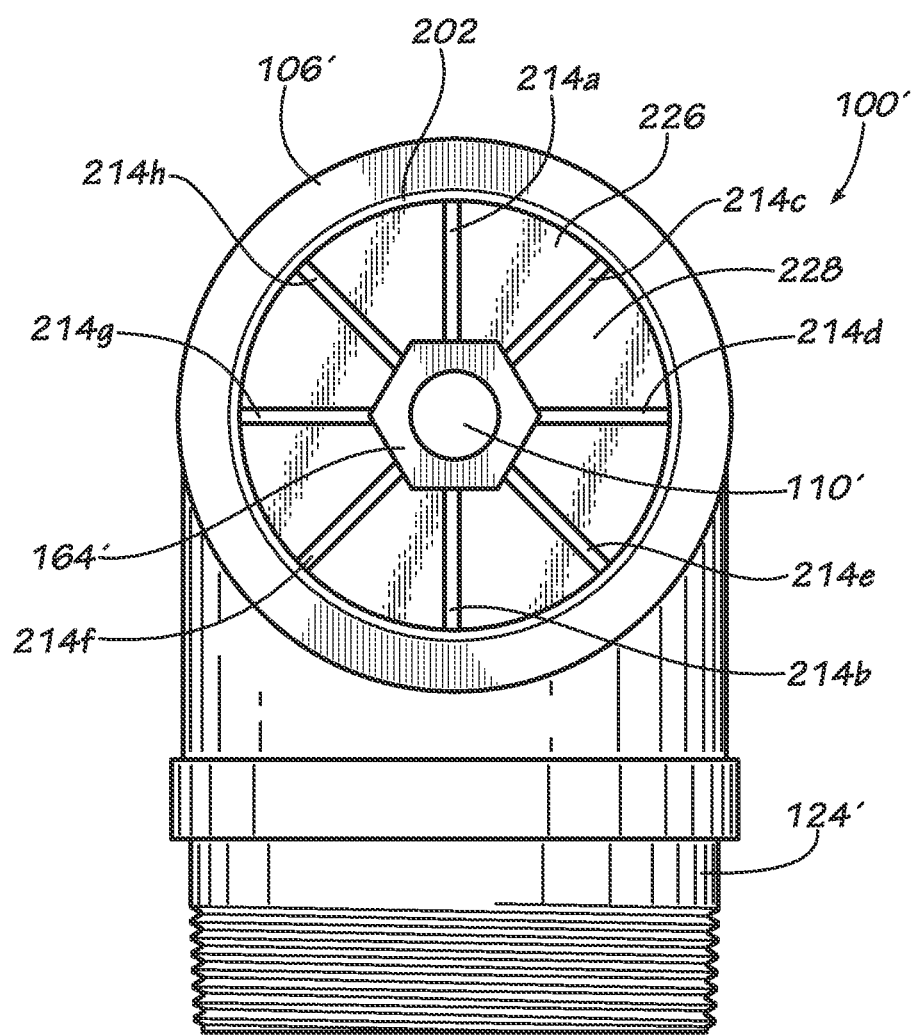
FIG. 7 is an end view of the throttling device of FIG. 6.

As shown in FIG. 6, the second stem support 206 is positioned in pipe nipple 202 in the present embodiment. In the present embodiment, the stem support 206 includes a second central nipple 216, configured to receive the stem 110' through the second central nipple 216, and spokes, such as spokes 214a,b, connecting the second central nipple 216 to the pipe nipple 202. FIG. 7 shows an end view of the throttling device 100' looking through orifice 122a'. As shown in FIG. 7, in various embodiments, the stem support 206 may include spokes 214a,b,c,d,e,f,g,h with openings defined between spokes to allow airflow through the stem support 206. The number of spokes 214 should not be considered limiting on the current disclosure.

In the present embodiment, the central nipple 216 include threading to threadably engage the stem 110'; however, in various other embodiments, the central nipple 216 does not include threading to threadably engage the stem 110'. Although one stem support 206 is disposed in pipe nipple 202 in the present embodiment, in various other embodiments, a plurality of stem supports may be disposed within pipe nipple 202.

In various embodiments, the stem supports 204,206 are integrally formed with the pipe nipples 184',202, respectively; however, in various other embodiments, the stem supports 204,206 are secured to the pipe nipples 184',202 with mechanisms including, but not limited to, welding, adhesives, or various other similar fastening mechanisms or each stem support 204,206 may be formed together with the respective pipe nipples 184',202 as a single structure. The disclosure of the stem supports 204,206 with the nipple and spoke assembly should not be considered limiting on the current disclosure. In various other embodiments, the stem supports 204,206 may include features such as vents, slots, or similar features capable of permitting fluid flow. Furthermore, in various other embodiments, the stem supports 204,206 may be substantially similar to stem support 158.

As shown in FIG. 6, the stem 110' is supported in the body 106' after the stem 110' is inserted through central nipples 212,216 with the springs 114',116' and throttle 112' already attached in various embodiments. After the stem 110' is inserted into the body 106' to a desired position, a fastener, such as a nut 164', which is substantially similar to nut 164, is positioned and secured on the stem 110' to secure the stem 110' to the stem supports 204,206.

In the present embodiment, the throttling device 100' further includes the second throttle 226 movably positioned on the stem 110' in addition to the throttle 112'. The second throttle 226 is similar to throttle 112 and 112' and may be selected from the group including, but not limited to, a disc, a plate, a ball, or any other similar item that may be movably positioned on the stem 110' and having a surface or surfaces on which the first spring 114' and/or the second spring 116' may engage and act upon to regulate the flow of air or any other gas into and out of the throttling device 100'. In the present embodiment, the throttle 226 is a disc. The second throttle 226 includes a first side 228 and a second side 230. In various embodiments, the second throttle 226 is positioned on the stem 110' such that the second throttle 226 is disposed within the body cavity 108'. In a neutral position, the first side 228 of the second throttle 226 engages the end 224 of pipe nipple 202. In these embodiments, the portion of the body cavity 108' between the first side 228 and body orifice 122a' defines a passageway 232. In the neutral position, the first side 228 of the second throttle 226 engages the end 224 of pipe nipple 202 such that the passageway 232 is closed. In various embodiments, if the second throttle 226 is moved a sufficient distance towards the second end 152' of the stem 110', a passageway opening may be created between the first side 228 and a body corner 234. In various embodiments, the second throttle 226 is constructed from a metallic material which is both durable and heat resistant, such as those materials from the group including, but not limited to, cast iron, ductile iron, carbon steel, stainless steel, and other similar materials.

As shown in FIG. 6, when assembled, the throttling device 100' includes the throttles 112',226 and springs 114',116' positioned on the stem 110' such that the first end 176' of the first spring 114' engages the second side 230 of the second throttle 226 and the second end 178' of the first spring 114' engages the first side 168' of the throttle 112'. The second spring 116' is positioned on the stem 110' such that the first end 186' of the second spring 116' engages the second side 170' of the throttle 112' and the second end 188' of the second spring 116' engages the stop surface 222 of the first stem support 204.

The throttling device 100' is configured to perform in substantially the same manner as described above with reference to throttling device 100. The second throttle 226 provides the additional capability for throttling device 100' to break a vacuum within the fluid system when pressure in the fluid system drops to a certain point such as during drainage of the system 102. In various embodiments, the second throttle 226 enables the throttling device 100' to break a vacuum when pressure in the fluid system drops to vacuum conditions such as −5 PSIG or various other vacuum conditions. In these embodiments, as the negative pressure in the system increases, and therefore as the vacuum in the fluid system increases, both throttles 112',226 are drawn towards each other until both discs 112',226 clear body corners 190,234, respectively. In these embodiments, after the discs 112',226 clear body corners 190,234, air is able to flow into the pipe system 102 through orifices 122a',122b' to break the vacuum and reduce the negative pressure.

Although the stem 110 or stem 110' are described in the current embodiments, in various other embodiments, the stem 110 or stem 110' may not be included in the throttling device 100. In various embodiments where the throttling device 100 does not include a stem 110, a first end of the biasing element, such as a first end of the first spring 114, may be welded, attached, or otherwise connected to the stem support 158 and a second end of the biasing element, such as a second end of the first spring 114, may be welded, attached, or otherwise connected to a side of the throttle 112 such as the first side 168. In various other embodiments, the first end of the biasing element may be welded, attached, or otherwise connected to other components of the throttling device 100 such as the pipe nipple 202, the inner surface 120 of the body 106, or various other elements sufficient to support the biasing element.

Referring back to FIGS. 1, 2, and 3, a method of venting air into a pipe system 102 and a method of allowing air into a pipe system 102 with the throttling device 100 and air valve 104 is described in further detail. It should be noted that any of the steps of any of the methods described herein may be performed in any order or could be performed in sub-steps that are done in any order or that are separated in time from each other by other steps or sub-steps, and the disclosure of a particular order of steps should not be considered limiting on the current disclosure. The pipe system 102, air valve 104, and the throttling device 100 with the stem 110, first spring 114, throttle 112, and second spring 116 is initially provided.

The air valve 104 is mounted on the pipe system 102 and the throttling device 100 is mounted on the air valve 104. In the throttling device 100, the stem 110 is disposed at least partially within the body cavity 108 of the throttling device 100. The throttle 112 is movably positioned on the stem 110 within the body cavity 108. The first spring 114 is positioned on the stem 110 and engages the first side 168 of the throttle 112. The second spring 116 is positioned on the stem 100 and engages the second side 170 of the throttle 112. The first spring 114 biases the throttle 112 towards a closed position where the passageway opening 172 is minimized or even completely closed and the throttle 112 is biased axially towards the orifice 122b. The second spring 116 biases the throttle 112 towards an open position where the passageway opening 172 is maximized and the throttle 112 is biased axially away from the orifice 122b. Together, the first spring 114 and second spring 116 bias the throttle 112 to a partially open position shown in FIG. 3.

The pipe system 102 typically includes both fluid and air. The type of fluid should not be considered limiting and may include drinking water, wastewater, industrial fluids and chemicals, fuel, drinkable liquids, or various other fluids and may include particulates or other solids or gases suspended or mixed with the fluid. The fluid and air enter the air valve 104 through the inlet 130 into the internal cavity 128 of the air valve 104, with air accumulating towards the upper portion of the air valve 104 near the outlet 132. At certain fluid levels, the fluid positions the float 136 away from the outlet 132 and outlet passageway 144. In this position where the outlet 132 is uncovered, fluid pressure within the pipe system 102 forces air out of the internal cavity 128 through the outlet 132 and outlet passageway 144. The air then flows through the pipe nipple 124 into the body cavity 108 of the throttling device 100.

Fluid pressure within the pipe system 102 acts on the throttle 112 with the first spring 114 to further bias the throttle 112 towards a closed position while the second spring 116 continues to bias the throttle 112 towards an open position. In this manner, the first spring 114 and second spring 116 regulate the size of the passageway opening 172 and the flow of air through the passageway 174 of the throttling device 100 into the atmosphere. When the venting rate of air through the throttling device 100 exceeds a predetermined threshold rate, the fluid drag and pressure moves the throttle 112 to minimize the remaining passageway and close the throttling device 100 and air valve 104. In various embodiments where the pipe nipple 184' is utilized, when the venting rate of air through the throttling device 100 exceeds a predetermined threshold rate, the fluid drag and pressure moves the throttle 112 to minimize the remaining passageway area through a notch 600 in the pipe nipple 184'. In various embodiments when the second side 170 of the throttle 170 contacts the end 194' of the pipe nipple 184', air may still flow through the notch 600 and into the atmosphere. In various embodiments, the notch 600 at the end 194' of the pipe nipple 184' allows for remaining system air volume to bleed off until the entire amount is exhausted into the atmosphere. The disclosure of the notch 600 should not be considered limiting as in various other embodiments, an annular space or other opening through the pipe nipple 184', throttle 112', body 106', or any other portion of the throttling device 100' may allow for remaining system air volume to bleed off until the entire amount is exhausted to atmosphere.

In various embodiments where the throttling device 100' is utilized instead of throttling device 100, fluid pressure within the pipe system 102 acts on the throttle 112' with the first spring 114' to further bias the throttle 112' towards a closed position while the second spring 116' continues to bias the throttle 112' towards an open position. In this manner, the first spring 114' and second spring 116' regulate the size of the passageway opening 172' and the flow of air through the passageway 174' of the throttling device 100' into the atmosphere. When air is vented from the pipe system 102, the fluid pressure within the pipe system 102 is greater than atmospheric pressure outside the pipe system 102. Second throttle 226 typically remains in the closed position when fluid pressure within the pipe system 102 is greater than the atmospheric pressure.

As air escapes the air valve 104, the fluid in the air valve 104 rises within the internal cavity 128 and the fluid positions the float 136 such that the float 136 covers and seals the outlet 132. When the float 136 covers the outlet 132, air ceases to leave the internal cavity 128 into the throttling device 100 and the throttle 112 returns to the neutral, partially-open position shown in FIG. 3 if the throttle 112 moved from the neutral position during the venting process. This venting process is repeated as more air enters the pipe system 104 and accumulates in the air valve 104 to move the fluid and fluid level such that the float 136 is positioned away from the outlet 132.

During draining of the pipe system 102 or in various other situations, it may be necessary to allow air to enter the pipe system 102 to prevent a vacuum condition. As the fluid in the pipe system 102 is lowered, the float 136 moves downward away from the outlet 132. In various embodiments, fluid pressure is lowered within the pipe system 102 such that air from outside the pipe system 102 is pulled into the throttling device 100 through the passageway 174 and passageway opening 172 and into the air valve 104. Fluid pressure acts on the throttle 112 with the second spring 116 to further bias the throttle 112 towards an open position while the first spring 114 continues to bias the throttle towards a closed position. In this manner, the first spring 114 and second spring 116 regulate the size of the passageway opening 172 and the flow of air through the throttling device 100 into the air valve 104 and pipe system 102.

In various embodiments where the throttling device 100' is utilized instead of throttling device 100, fluid pressure acts on the throttle 112' with the second spring 116' to further bias the throttle 112' towards an open position while the first spring 114' continues to bias the throttle 112' towards a closed position. In addition, at certain fluid pressure conditions as described above, when an air intake rate reaches a predetermined threshold, the fluid pressure also acts on the second throttle 226 to bias the second throttle 226 towards an open position where a passageway opening is created between the first side 228 of the second throttle 226 and the body corner 234 into passageway 232. Air is pulled into the throttling device through passageway 232 and passageway 174' and into the air valve 104, increasing the rate of air intake into the pipe system 102 to prevent a vacuum condition within the system 102 that would potentially be created if fluid leaves the system faster than air can flow into the system 102 to replace it.

The rate of vacuum relief air intake for 100' may be a two stage process. Stage one and stage two may be dependent on the choice of the first and second springs 114',116' or nested springs and the initial operator setting of throttle 112'. A lighter spring rate on the second spring 116' may allow a lighter crack open pressure to allow limited vacuum break potential for lower vacuum levels. Secondary throttle may require a higher vacuum level before allowing second stage vacuum break potential through compression of the first spring 114' by the second throttle 226 and, ultimately full opening of both first and second throttle for full vacuum protection.

One should note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of the present disclosure. Many variations and modifications may be made to the above-described embodiment(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

That which is claimed is:

1. A throttling device comprising:
   a body having an inner surface and an outer surface, the inner surface defining a body cavity, the inner surface and the outer surface defining a plurality of body orifices in fluid communication through the body cavity;
   a throttle movably positioned within the body cavity proximate to a first orifice of the plurality of body orifices, the throttle movable to a closed position closing the first orifice and to an open position opening a fluid pathway between the first orifice and the body cavity; and
   a biasing element biasing the throttle to a partially-open position between the closed position and the open position, the biasing element comprising:
   a first spring, the first spring engaging a first side of the throttle and biasing the throttle towards the closed position; and
   a second spring, the second spring engaging a second side of the throttle and biasing the throttle towards the open position, the first spring and the second spring together biasing the throttle to a partially-open position.

2. The throttling device of claim 1, further comprising a spring stop, wherein the second spring is positioned between the throttle and the spring stop.

3. The throttling device of claim 1, further comprising a stem disposed at least partially within the body cavity, the stem defining an axis, wherein the throttle is positioned on the stem and is axially movable along the stem relative to the axis.

4. The throttling device of claim 3, further comprising a stem support mounted in a second orifice of the plurality of orifices in the body, the stem support receiving the stem and the stem extending through the stem support.

5. The throttling device of claim 4, wherein a first spring of the biasing element is positioned on the stem between the stem support and the throttle.

6. The throttling device of claim 1, wherein the throttle is a first throttle, the throttling device further comprising a second throttle, the second throttle movably positioned proximate to a second orifice of the plurality of orifices in the body, the second throttle movable to a closed position closing the second orifice and to an open position opening a fluid pathway between the second orifice and the body cavity.

7. The throttling device of claim 6, wherein the biasing element biases the second throttle towards the closed position of the second throttle.

8. The throttling device of claim 7, wherein the biasing element includes a first spring, the first spring engaging the first throttle and the second throttle, the first spring biasing the first throttle to the closed position of the first throttle and biasing the second throttle to the closed position of the second throttle.

9. The throttling device of claim 3, further comprising a stop pin defined on the stem, wherein the throttle is movably positioned on the stem between the stop pin and an end of the stem.

10. A throttling device comprising:
    a body having an inner surface and an outer surface, the inner surface defining a body cavity, the inner surface and the outer surface defining a plurality of body orifices in fluid communication through the body cavity;
    a throttle movably positioned within the body cavity proximate to a first orifice of the plurality of body orifices, the throttle movable to a closed position closing the first orifice and to an open position opening a fluid pathway between the first orifice and the body cavity;
    a stem disposed at least partially within the body cavity, the stem defining an axis, the throttle positioned on the stem and axially movable along the stem relative to the axis; and
    a biasing element biasing the throttle to a partially-open position between the closed position and the open position wherein the stem is axially fixed relative to the body.

11. The throttling device of claim 10, further comprising a stem support mounted in a second orifice of the plurality of orifices in the body, the stem support receiving the stem and the stem extending through the stem support.

12. The throttling device of claim 11, wherein the first orifice is defined opposite from the second orifice in the body.

13. The throttling device of claim 11, wherein the biasing element comprises a first spring positioned on the stem between the stem support and the throttle.

14. The throttling device of claim 11, wherein:
    the stem support is a first stem support;
    the throttling device further comprises a second stem support mounted within the first orifice of the plurality of orifices in the body; and
    the second stem support receives the stem.

15. A throttling device comprising:
    a body having an inner surface and an outer surface, the inner surface defining a body cavity, the inner surface and the outer surface defining a plurality of body orifices in fluid communication through the body cavity;

a throttle movably positioned within the body cavity proximate to a first orifice of the plurality of body orifices, the throttle movable to a closed position closing the first orifice and to an open position opening a fluid pathway between the first orifice and the body cavity;

a stem, the stem attached to the body, the stem disposed at least partially within the body cavity, the throttle positioned on the stem, and axially movable along the stem, the stem defining an axis, the stem axially fixed relative to the body; and a biasing element biasing the throttle to a partially-open position between the closed position and the open position.

16. The throttling device of claim 15, wherein the biasing element comprises a first spring positioned on the stem between the stem support and the throttle.

17. The throttling device of claim 15, wherein the throttle is a first throttle, the throttling device further comprising a second throttle, the second throttle movably positioned proximate to a second orifice of the plurality of orifices in the body, the second throttle movable to a closed position closing the second orifice and to an open position opening a fluid pathway between the second orifice and the body cavity.

18. The throttling device of claim 17, wherein the biasing element biases the second throttle towards the closed position of the second throttle.

* * * * *